(12) United States Patent
Shiomi (10) Patent No.: US 11,858,438 B2
(45) Date of Patent: Jan. 2, 2024

(54) VEHICULAR APPARATUS

(71) Applicant: DENSO CORPORATION, Kariya (JP)

(72) Inventor: Tsuyoshi Shiomi, Kariya (JP)

(73) Assignee: DENSO CORPORATION, Kariya (JP)

( * ) Notice: Subject to any disclaimer, the term of this patent is extended or adjusted under 35 U.S.C. 154(b) by 172 days.

(21) Appl. No.: 17/578,843

(22) Filed: Jan. 19, 2022

(65) Prior Publication Data

US 2022/0134978 A1 May 5, 2022

Related U.S. Application Data

(63) Continuation of application No. PCT/JP2020/027506, filed on Jul. 15, 2020.

(30) Foreign Application Priority Data

Jul. 22, 2019 (JP) ................. 2019-134532

(51) Int. Cl.
*B60R 16/03* (2006.01)
*G01P 21/00* (2006.01)

(52) U.S. Cl.
CPC .............. *B60R 16/03* (2013.01); *G01P 21/00* (2013.01)

(58) Field of Classification Search
CPC ............. B60R 16/03; G01P 21/00; H02J 7/00
See application file for complete search history.

(56) References Cited

U.S. PATENT DOCUMENTS

| 2003/0011735 A1 | 1/2003 | Kato |
| 2015/0346914 A1 | 12/2015 | Ebi |
| 2015/0369625 A1 | 12/2015 | Takahira |
| 2018/0149230 A1* | 5/2018 | Kono ............... F16F 15/005 |
| 2020/0148144 A1 | 5/2020 | Shiomi |

FOREIGN PATENT DOCUMENTS

| JP | 2003-029288 A | 1/2003 |
| JP | 6015459 B2 | 10/2016 |
| JP | 2019-018844 A | 2/2019 |
| WO | WO-2014/122917 A1 | 8/2014 |

* cited by examiner

*Primary Examiner* — Daniel Cavallari
(74) *Attorney, Agent, or Firm* — Harness, Dickey & Pierce, P.L.C.

(57) ABSTRACT

A vehicular apparatus includes a first power supply circuit, a second power supply circuit, a correction unit, and a sensor configured to detect an angular velocity or acceleration applied to a vehicle. The first power supply circuit is configured to perform a first power supply with a first minimum operating voltage. The second power supply circuit is configured to perform a second power supply with a second minimum operating voltage set to be lower than the first minimum operating voltage. The second power supply circuit is enabled to start the second power supply before an engine of a vehicle is started. The correction unit is configured to perform a process related to a zero point correction of the sensor. Herein, the sensor and the correction unit are configured to receive the second power supply from the second power supply circuit.

9 Claims, 5 Drawing Sheets

VEHICULAR APPARATUS

CROSS REFERENCE TO RELATED APPLICATIONS

The present application is a continuation application of International Patent Application No. PCT/JP2020/027506 filed on Jul. 15, 2020, which designated the U.S. and claims the benefit of priority from Japanese Patent Application No. 2019-134532 filed on Jul. 22, 2019. The entire disclosures of all of the above applications are incorporated herein by reference.

TECHNICAL FIELD

The present disclosure relates to a vehicular apparatus.

BACKGROUND

In a known vehicular navigation apparatus, the vehicle position and traveling direction are estimated based on (i) the angular velocity detected by the gyro sensor and (ii) the vehicle speed and acceleration detected by the vehicle speed sensor and the acceleration sensor; a vehicle mark indicating the direction of the vehicle is thereby displayed.

In order to correctly detect the angular velocity with the gyro sensor, it is necessary to correct the zero point of the gyro sensor while the vehicle is stopped after the power of the gyro sensor is turned on. If this zero point correction is not performed, the direction of the vehicle cannot be estimated correctly. This may give a sense of discomfort such as the displayed vehicle mark straying. Therefore, there is disclosed a technique in which when the zero point correction cannot be performed, a display format different from the usual one is used so as not to give such a sense of discomfort.

SUMMARY

According to an example of the present disclosure, a vehicular apparatus is provided to include a first power supply circuit, a second power supply circuit, a correction unit, and a sensor configured to detect an angular velocity or acceleration applied to a vehicle. The first power supply circuit is configured to perform a first power supply with a first minimum operating voltage. The second power supply circuit is configured to perform a second power supply with a second minimum operating voltage set to be lower than the first minimum operating voltage. The second power supply circuit is enabled to start the second power supply before an engine of a vehicle is started. The correction unit is configured to perform a process related to a zero point correction of the sensor. Herein, the sensor and the correction unit are configured to receive the second power supply from the second power supply circuit.

BRIEF DESCRIPTION OF DRAWINGS

The objects, features, and advantages of the present disclosure will become more apparent from the following detailed description made with reference to the accompanying drawings.

FIG. 6 is a diagram showing a transition of the state of each part after the power is turned on.

DETAILED DESCRIPTION

Figure 1:
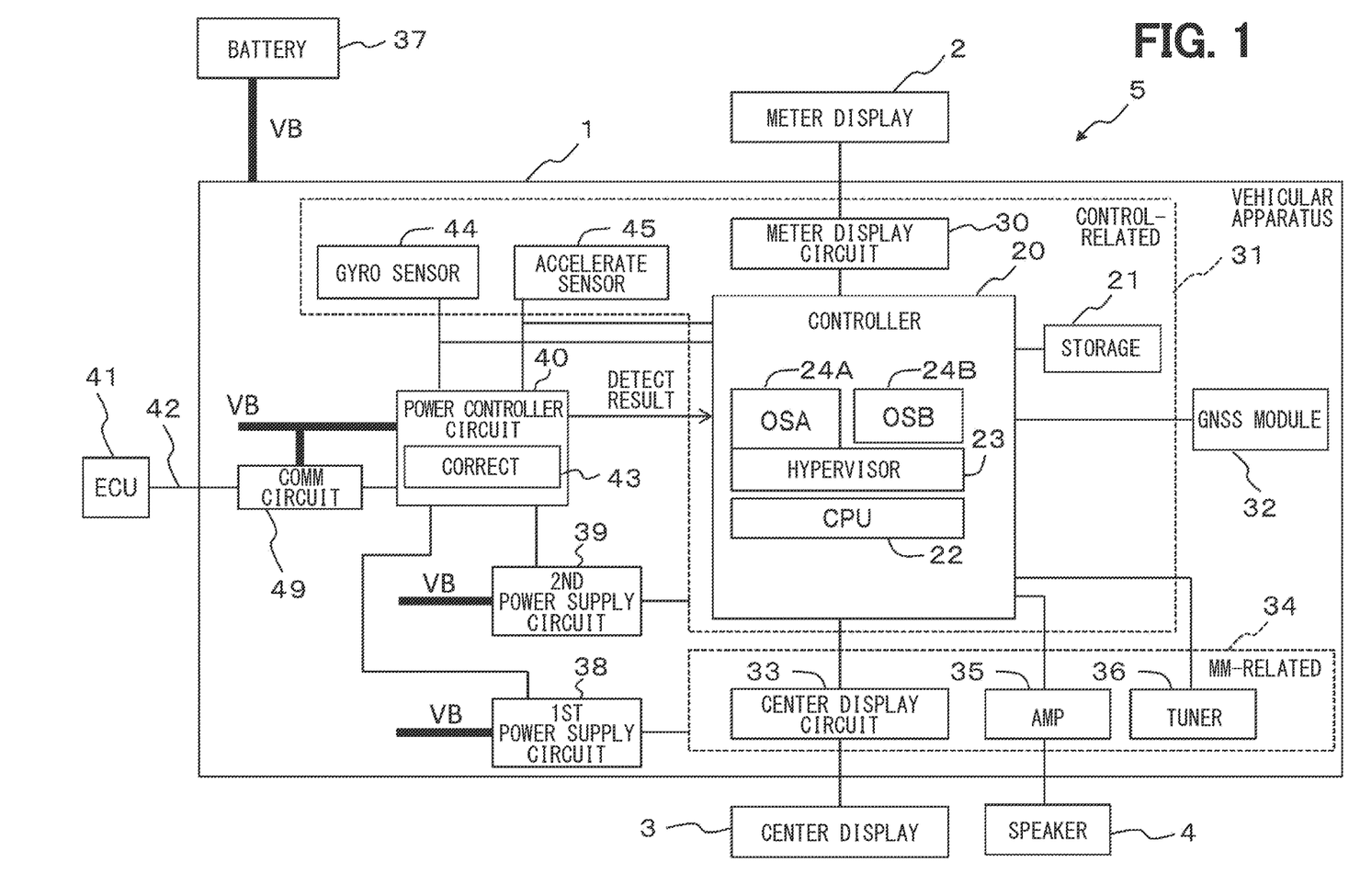
FIG. 1 is a diagram schematically showing a configuration of a vehicular apparatus according to an embodiment.

Hereinafter, an embodiment will be described. As shown in FIG. 1, a vehicular apparatus 1 is connected to a plurality of display devices such as a meter display 2 and a center display 3. As will be described later, these display devices performs a display of information necessary for the vehicle to travel, information on route guidance, information on the operation of the vehicular apparatus 1, and the like. The configuration of the display devices is an example; there is no need to be limited thereto. Further, the vehicular apparatus 1 is also connected to, for example, a speaker 4 which can play music. The vehicular apparatus 1 is included in a cockpit system 5 that realizes so-called vehicle infotainment.

Figure 2:
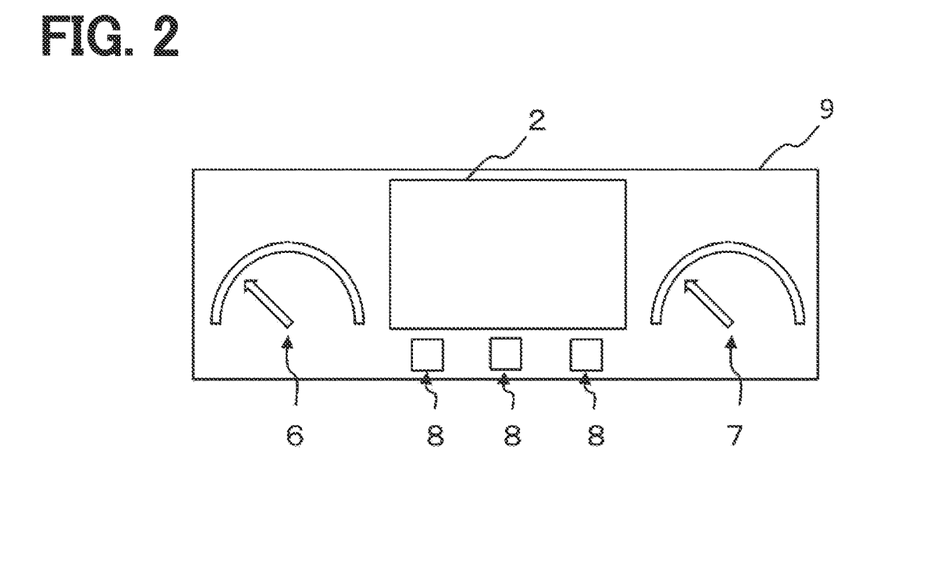
FIG. 2 is a diagram schematically showing a configuration of a meter display.

The meter display 2 is composed of, for example, a liquid crystal display or an organic EL display, and is provided adjacent to the front of the driver. More specifically, as shown in FIG. 2, the meter display 2 is arranged at the center of the meter panel 9 provided with a speedometer 6, a tachometer 7, various warning lights 8, and the like. Note that the meter panel 9 may be entirely composed of a display device as a meter display 2, to perform displays in full graphics of a speedometer 6, a tachometer 7, warning lights 8 and the like.

Figure 3:
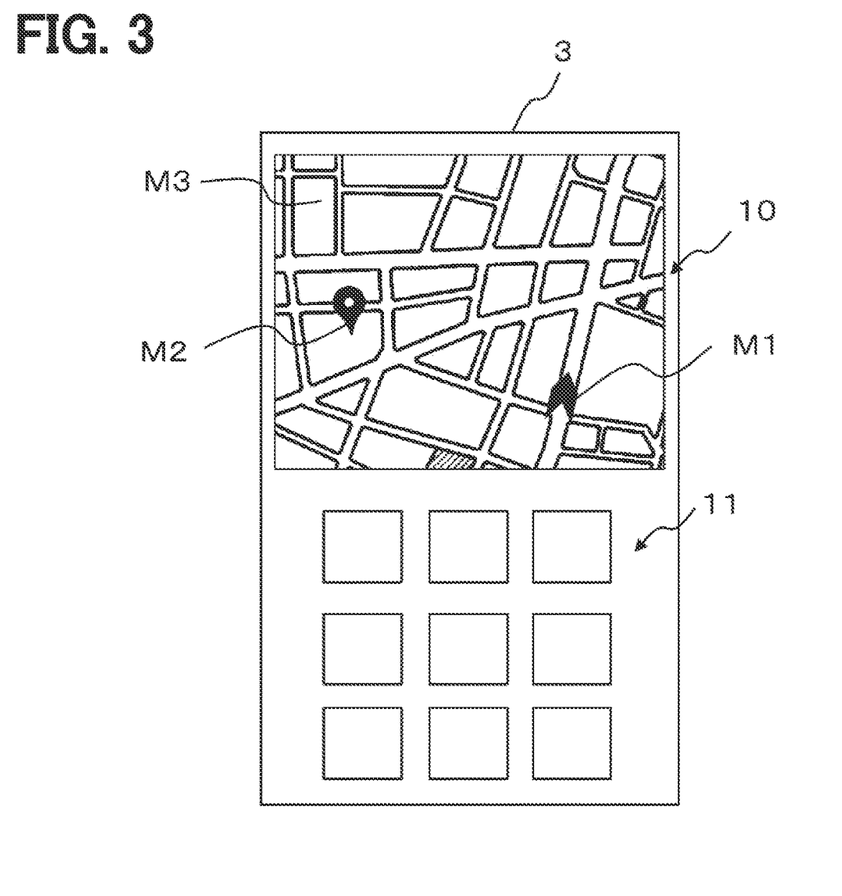
FIG. 3 is a diagram schematically showing a configuration of a center display.

The center display 3 is composed of, for example, a liquid crystal display or an organic EL display, and is arranged to be adjacent to a so-called center console. As shown in FIG. 3, the center display 3 displays, for example, a navigation screen image 10 and/or a menu screen image 11. On the navigation screen image 10, a vehicle mark M1 indicating the position and direction of the vehicle, a destination mark M2 indicating the destination of the route guidance, and the like are displayed so as to overlap the map image M3. The direction of the vehicle mark M1 when displayed is determined by estimating the direction of the vehicle based on the acceleration and the angular velocity applied to the vehicle. The details will be described later.

Further, the center display 3 can also display a television broadcast, a music reproduction screen image, or the like. Further, in the vehicular apparatus 1, the center display 3 and the meter display 2 can display images seamlessly to each other, and for example, the navigation screen image 10 can be displayed on the meter display 2.

The vehicular apparatus 1 includes a controller unit 20, which also be referred to as an application controller 20 or a second controller 20. The controller unit 20 is composed of a so-called microcomputer having a CPU 22 and the like. The controller unit 20 controls the vehicular apparatus 1 by executing a computer program stored in a storage device 21 composed of a non-volatile memory or the like. The storage device 21 may also be referred to as a storage 21.

More specifically, on the controller unit 20, a virtual environment is configured by (i) a hypervisor 23 operating on the CPU 22 and (ii) a plurality of operating systems 24 operating on the hypervisor 23. Hereinafter, the operating system 24 will be referred to as an OS 24.

In the present embodiment, the OS 24A has a hypervisor function; the hypervisor 23 is realized by such a hypervisor function, and the OS 24B is operated on the hypervisor 23. Note that the hypervisor 23 may be provided independently to operate the OS 24A and the OS 24B.

The OS 24A is a so-called real-time OS, and performs processing that requires real-time performance as compared with the OS 24B. The OS 24A mainly processes information related to the vehicle, such as information related to the running and/or safety of the vehicle. In general, such a real-time OS is less likely to cause a problem in the OS 24A itself, and can be considered to have relatively higher stability than a general-purpose OS because it can predict or limit the execution time of an application program. Hereinafter, an application program will also be referred to as an application.

In contrast, the OS 24B is a so-called general-purpose OS. Although its real-time performance is relatively low as compared with the OS 24A, it has an advantage that general-purpose processing such as a so-called multimedia function can be easily executed. In this way, the vehicular apparatus 1 operates a plurality of OSs 24 so that the processing can be shared according to the required functions.

Figure 4:
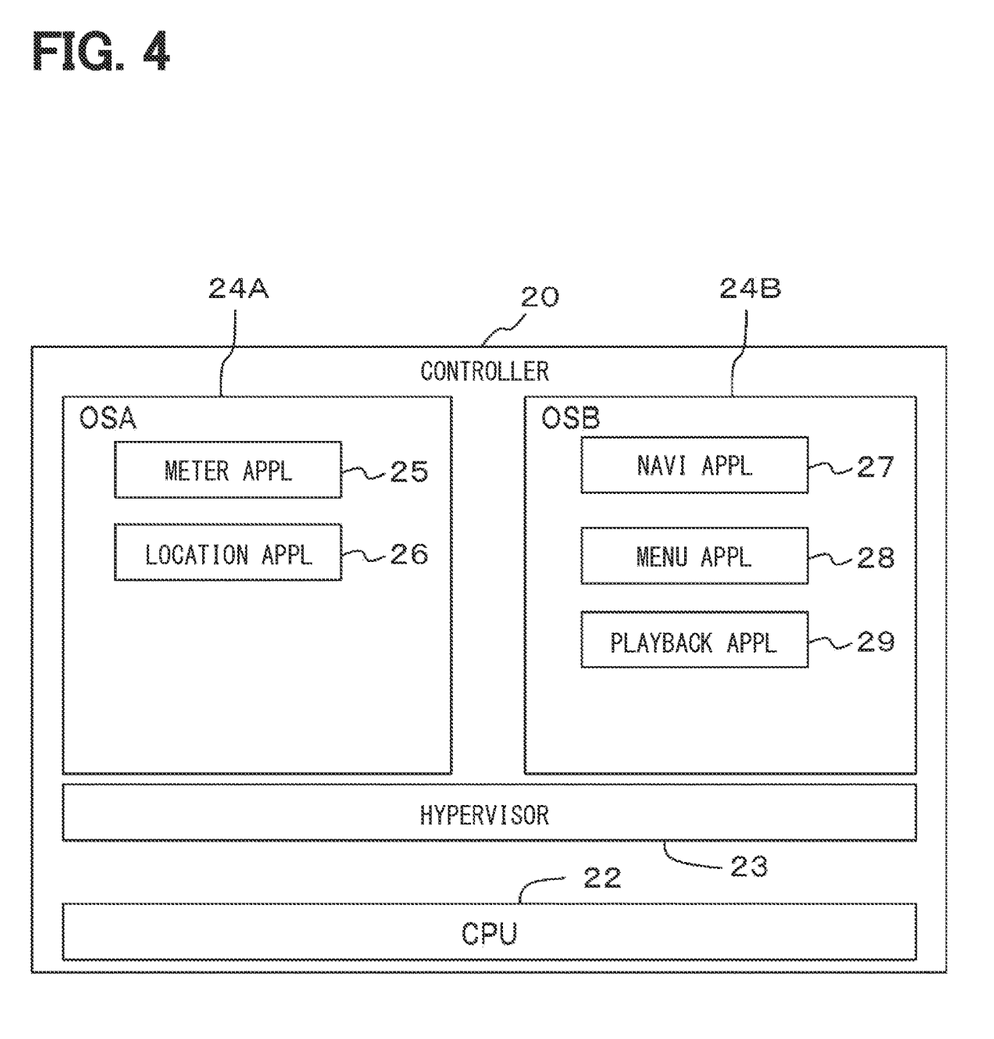
FIG. 4 is a diagram schematically showing a software configuration of a controller unit.

The controller unit 20 realizes various functional units included in the vehicular apparatus 1 by software by appropriately executing applications on each OS 24. For example, in the controller unit 20, as shown in FIG. 4, a meter application 25, a location application 26, and the like are executed on the OS 24A. Further, a navigation application 27, a menu application 28, a playback application 29, and the like are executed on the OS 24B. The number or types of applications executed on each OS 24 are examples, and are not limited to these. It is also possible to provide a functional unit realized by hardware instead of software.

The meter application 25 displays images such as a speedometer 6, a tachometer 7, and warning lights 8 on the meter display 2. That is, the meter application 25 is provided as a control-related functional unit that displays information on the running and safety of the vehicle. Since the information displayed by the meter application 25 relates to the running and safety of the vehicle, the warning lights 8 are displayed, for example, to indicate whether or not a seatbelt is worn and what is stipulated by law. In this case, the meter application 25 is implemented on the OS 24A because prompt display and appropriate update are required.

As shown in FIG. 1, the information displayed by the meter application 25 is transmitted to the meter display 2 as drawing data in, for example, LVDS format via the meter display circuit 30. The meter display circuit 30 is controlled by the controller unit 20, and corresponds to a device mainly used by the control-related functional unit. Hereinafter, the device mainly used by the control-related functional unit is referred to as a control-related device 31.

The location application 26 executes (i) a process of performing a zero point correction of the sensor and (ii) a process of specifying the direction of the vehicle based on the acceleration and the angular velocity applied to the vehicle detected by the sensors during normal operation. The details will be described later. The current position and the direction of the vehicle specified by the location application 26 are transmitted to the navigation application 27 and used when displaying the navigation screen image 10.

Further, the location application 26 performs a process of receiving the position information from the satellite of the satellite positioning system by the GNSS module 32 and acquiring the current position of the vehicle. The satellite positioning system adopts the Global Positioning System in the present embodiment. However, other methods such as GLONASS, Galileo, and BeiDou Navigation Satellite System can also be adopted. Further, although the GNSS module 32 is removed from the control-related device 31 in the present embodiment, it can be included in the control-related device 31.

The navigation application 27 generates a navigation screen image 10 to be displayed on the center display 3 and performs processing such as route guidance. In this case, multimedia image processing is performed on the display of the navigation screen image 10. That is, the navigation application 27 is provided as a multimedia-related functional unit that mainly performs multimedia processing. Therefore, the navigation application 27 is implemented on the OS 24B. Hereinafter, the multimedia-related will be referred to as MM-related for convenience.

The information displayed by the navigation application 27 is transmitted to the center display 3 as drawing data in LVDS format, for example, via the center display circuit 33. The center display circuit 33 corresponds to a device mainly used by a MM-related functional device. Hereinafter, the device mainly used by the MM-related functional unit is referred to as a MM-related device 34.

The menu application 28 performs processes such as generation of a menu screen image 11 to be displayed on the center display 3 and acceptance of user operations. In this case, the MM-related processing such as image processing is performed on the display of the menu screen image 11. That is, the menu application 28 is provided as a MM-related functional unit. Therefore, the menu application 28 is implemented on the OS 24B.

The playback application 29 performs processing such as outputting audio from a speaker 4 via an amplifier 35 and playing back a radio broadcast or a television broadcast received by a tuner 36. In this case, the playback application 29 performs the MM-related processing such as audio processing and image processing. That is, the menu application 28 is provided as a MM-related functional unit. Therefore, the menu application 28 is implemented on the OS 24B. These amplifier 35 and tuner 36 are each included in the MM-related device 34.

As illustrated in FIG. 1, the vehicular apparatus 1 mounted on the vehicle is supplied with power from the battery 37. Hereinafter, the power supply supplied from the battery 37 is referred to as VB for convenience. Further, in FIG. 1, VB is shown by a relatively thick solid line for the sake of explanation.

The vehicular apparatus 1 is provided with the control-related device 31 and the MM-related device 34 described above. Of these, the control-related device 31 displays information related to vehicle running and safety, such as the controller unit 20, the storage device 21, or the meter display circuit 30. Therefore, the control-related device 31 is considered as a device that should have been operated at the time when the vehicular apparatus 1 is activated. On the other hand, the center display circuit 33, the amplifier 35, the tuner 36, and the like are considered as a device that should have not been necessarily operated at the time when the vehicular apparatus 1 is activated.

Therefore, the vehicular apparatus 1 is provided with (i) a first power supply circuit 38 that supplies power to the MM-related device 34 and (ii) a second power supply circuit 39 that supports low voltage and supplies power to the control-related device 31. The first power supply circuit 38 is connected to VB. The first power supply circuit 38 has a first minimum operating voltage at which power can be supplied; this first minimum operating voltage of the first power supply circuit 38 is set to be higher than that (i.e., a second minimum voltage) of the second power supply circuit 39.

More specifically, the first minimum operating voltage of the first power supply circuit 38 is higher than the minimum value of the power supply voltage of the battery 37 at the time of cranking to drive the motor at the time of starting the engine. Therefore, the first power supply circuit 38 is stopped from supplying power when the voltage of the battery 37 drops below the first minimum operating voltage during cranking. Therefore, the MM-related device 34, which is supplied with power from the first power supply circuit 38, also stops operating.

On the other hand, the second power supply circuit 39 has a low-voltage compatible circuit configuration in which the second minimum operating voltage at which power supply can be started is set to be lower than the first minimum voltage of the first power supply circuit 38, and the power supply can be continued even if the voltage of the battery 37 drops during cranking. In the present embodiment, such a low-voltage compatible circuit configuration is provided to enable the power supply to be continued if the voltage of the battery 37 is about 4 V or more. Therefore, the power supply of the second power supply circuit 39 is stable even during cranking, and the operation of the control-related device 31 receiving the power supply from the second power supply circuit 39 is stable even during cranking.

The first power supply circuit 38 and the second power supply circuit 39 are controlled by a power supply controller unit 40 that is provided separately from the controller unit 20. The power supply controller unit 40 may also be referred to as a power supply controller 40, a power controller 40, or a first controller 40. The power supply controller unit 40 is composed of a microcomputer.

The power supply controller unit 40 is activated with the input of a signal via the CAN line 42 and a communication circuit 49 as a trigger. Such a signal is input from the ECU 41 mounted on the vehicle; the signal indicates that the door is open, that is, indicates that the vehicular apparatus 1 may be used. In this case, the power supply controller unit 40 has very few tasks to be processed at both the startup and the normal operation as compared with the controller unit 20. The startup time of the power supply controller unit 40 is thus very short and the responsiveness of the power supply controller unit 40 is relatively high.

Therefore, the first power supply circuit 38 and the second power supply circuit 39 can start the power supply before starting the engine. The engine is started when the operation for turning on the ignition is input.

The power supply controller unit 40 is provided with a correction unit 43. In the present embodiment, the correction unit 43 is a functional unit that performs a process related to a zero point correction of the gyro sensor 44 and the acceleration sensor 45. The zero point correction samples the output from the gyro sensor 44 for a predetermined period of time when the angular velocity is not applied to the gyro sensor 44, that is, when the vehicle is stopped. As a result, the zero point at which the angular velocity becomes zero is obtained, and the value is stored in a memory or the like as a correction value. Similarly, for the acceleration sensor 45, the correction unit 43 obtains a zero point at which the acceleration becomes zero when the vehicle is stopped, and stores the value as a correction value.

Note that the calculation itself for finding the zero point is performed by the location application 26. Therefore, the correction unit 43 of the present embodiment performs a process related to the zero point correction. More specifically, the correction unit 43 performs a process of sampling data in order to obtain a zero point as a process related to the zero point correction. This is because the startup time of the power supply controller unit 40 is very short, so that the correction unit 43 is in an operable state immediately after the start of power supply.

At this time, the correction unit 43 performs sampling by communicating with the gyro sensor 44 and the acceleration sensor 45, and temporarily stores the data output from each sensor. At the same time, after the controller unit 20 is activated, the stored data is passed to the controller unit 20. That is, the correction unit 43 acts on behalf of sampling until the controller unit 20 is activated.

The gyro sensor 44 detects the angular velocity applied to the vehicle. Further, the acceleration sensor 45 detects the acceleration applied to the vehicle. The direction of the displayed vehicle mark M1 is determined based on the angular velocity detected by the gyro sensor 44 and the vehicle speed and acceleration detected by the acceleration sensor 45. The gyro sensor 44 and the acceleration sensor 45 are provided as a control-related device 31, and power is supplied from the second power supply circuit 39.

Next, the operation of the vehicular apparatus 1 having the above configuration will be described. As described above, when the power of the gyro sensor 44 is turned on, it takes a certain period of time for the output to stabilize. Therefore, if the vehicle is moved immediately after the gyro sensor 44 receives the power supply, a situation may occur in which the zero point correction of the gyro sensor 44 is not completed.

Further, it is known that when the vehicle is started, the power supply voltage supplied from the battery 37 drops by cranking as described above. When the voltage drops, the power is not supplied to the gyro sensor 44, and the time to start the zero point correction is delayed. It is thus assumed that the zero point correction is not completed by the time when the vehicle is moved.

Then, in such a situation, the gyro sensor 44 cannot be used until the vehicle stops, even though the gyro sensor 44 is provided. This also applies to the acceleration sensor 45.

In addition, it is difficult to adopt a power supply circuit only for the gyro sensor 44 because there is a big hurdle mainly in costs. In a known so-called single-functional navigation apparatus, a countermeasure that does not use the gyro sensor 44 has been adopted by giving up using the gyro sensor 44 immediately after activation.

Therefore, the vehicular apparatus 1 of the present embodiment reduces the possibility that the zero point correction may not be completed before the vehicle starts moving as follows.

As described above, the vehicular apparatus 1 is an integrated type which integrates a plurality of functional units including a control-related functional unit and a MM-related functional unit. In this case, the control-related functional unit includes a functional unit that needs to be used immediately after activating the vehicular apparatus 1, such as the meter application 25 that displays on the meter display 2 described above. Then, the meter application 25 performs a display of information, which should be displayed before the vehicle travels and which should be displayed even during cranking, such as a display as to whether or not the seatbelt is worn and a display stipulated by the law.

Therefore, unlike a known navigation apparatus, the vehicular apparatus 1 has a strong motivation to enable quick start of control in a situation where the vehicular apparatus 1 may be used. The vehicular apparatus 1 also has a strong motivation to enable the control even during cranking.

Therefore, in the vehicular apparatus 1, the control can be started quickly. The power supply controller unit 40 starts power supply from the first power supply circuit 38 and the second power supply circuit 39, triggered by the input of a signal indicating that the door of the vehicle is open. As a result, power is supplied to the control-related device 31 including the meter display circuit 30 before the controller unit 20 is activated.

When the power supply from the second power supply circuit 39 is started, the power supply is also performed to the gyro sensor 44 and the acceleration sensor 45. Therefore, the gyro sensor 44 and the acceleration sensor 45 can be put into an operable state before the controller unit 20 is activated. Further, as indicated in FIG. 1, the second power supply circuit 39 supplies the power to the power supply controller unit 40 and the correction unit 43.

The correction unit 43 that performs a process related to the zero point correction of the gyro sensor 44 and the acceleration sensor 45 is provided to be included in the power supply controller unit 40 having a short startup time and high responsiveness. Therefore, the correction unit 43 becomes operable immediately after the power supply is started, and can perform the process related to the zero point correction.

In this way, the gyro sensor 44 and the acceleration sensor 45 are configured to receive the power supply from the second power supply circuit 39 responding to a low voltage. This makes it possible to perform the process related to the zero point correction of the gyro sensor 44 and the acceleration sensor 45 even before the controller unit 20 is activated or during cranking.

The second power supply circuit 39 is required to supply power to the control-related device 31, so that the vehicular apparatus 1 is provided as an integrated type. This is because the big hurdle in a known navigation apparatus for which it is difficult to adopt a dedicated power supply circuit in the costs has been cleared. In other words, the configuration of the vehicular apparatus 1 is not merely a design, but is adopted based on technical motivation in view of the specifications of the vehicular apparatus 1.

By the way, the correction unit 43 not only performs the process related to the zero point correction, but also temporarily stores the sampled data output by the gyro sensor 44 and the acceleration sensor 45. Specifically, the correction unit 43 executes the process shown in FIG. 5 at the startup, and determines in step S1 whether the sensor output is stable. Although it is simply shown as a sensor in FIG. 5, the same processing is performed on each of the gyro sensor 44 and the acceleration sensor 45. When the correction unit 43 determines that the sensor output is not stable, the result becomes NO in step S1, and therefore waits for the sensor output to be stable.

Figure 5:
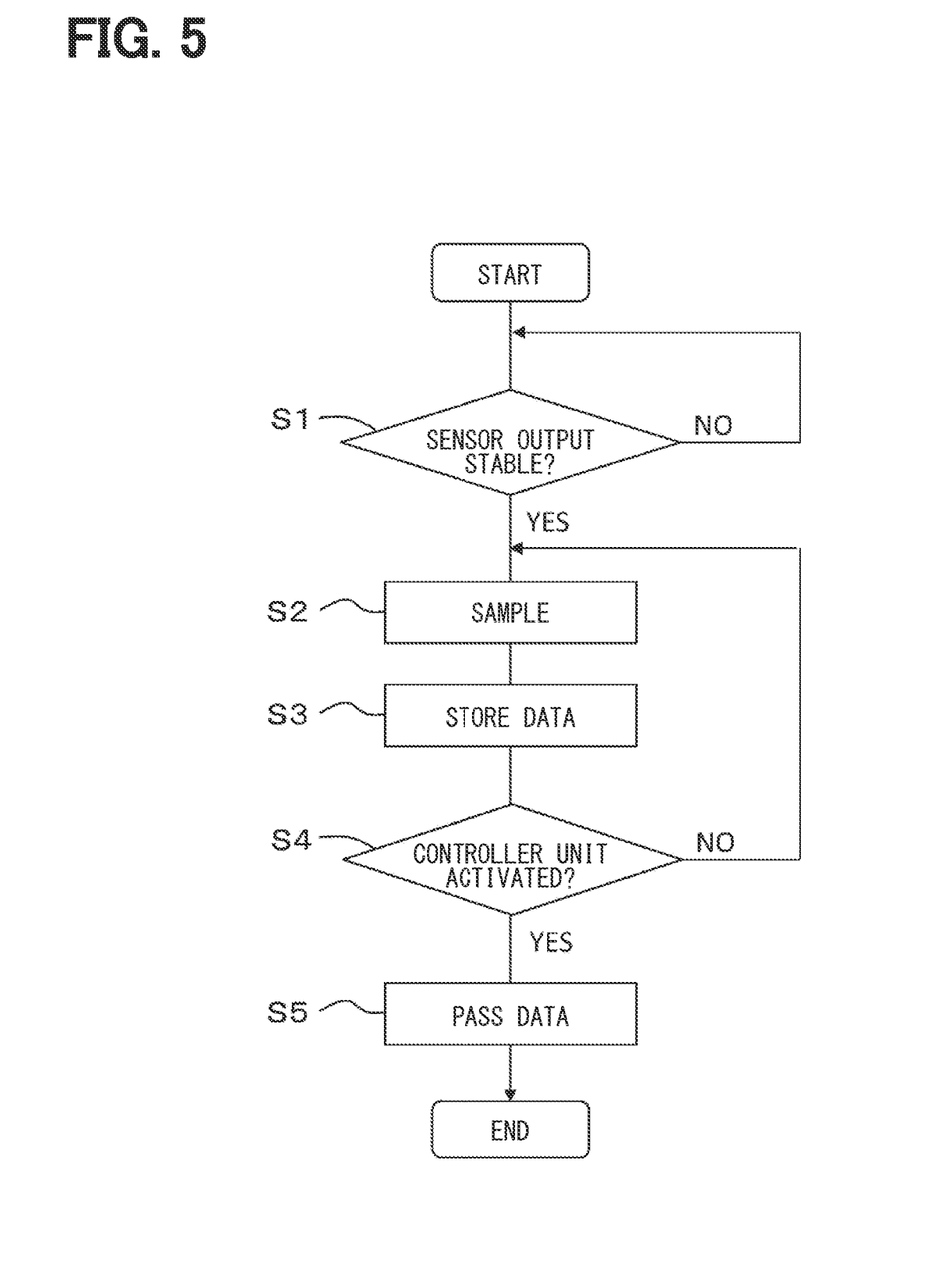
FIG. 5 is a diagram showing a flowchart of a process related to a zero point correction by a correction unit.

On the other hand, when the correction unit 43 determines that the sensor output is stable, the result becomes YES in step S1. Therefore, the data output by the target sensor is sampled in step S2, and the data is stored in step S3. After that, the correction unit 43 determines whether the controller unit 20 is activated in step S4. When it determines that the controller unit 20 is not activated, the result becomes NO in step S4. Therefore, the process proceeds to step S2 and the next sampling is performed. In this case, the correction unit 43 performs the next sampling after the predetermined sampling cycle has elapsed.

Then, when the correction unit 43 determines that the controller unit 20 is activated, the result becomes YES in step S4. Therefore, the correction unit 43 delivers the stored data to the controller unit 20 in step S5. The correction unit 43 does not need to wait for the activation of all the functional units of the controller unit 20 to be completed. It can be determined that the controller unit 20 is activated when the location application 26 can accept the data.

Figure 6:
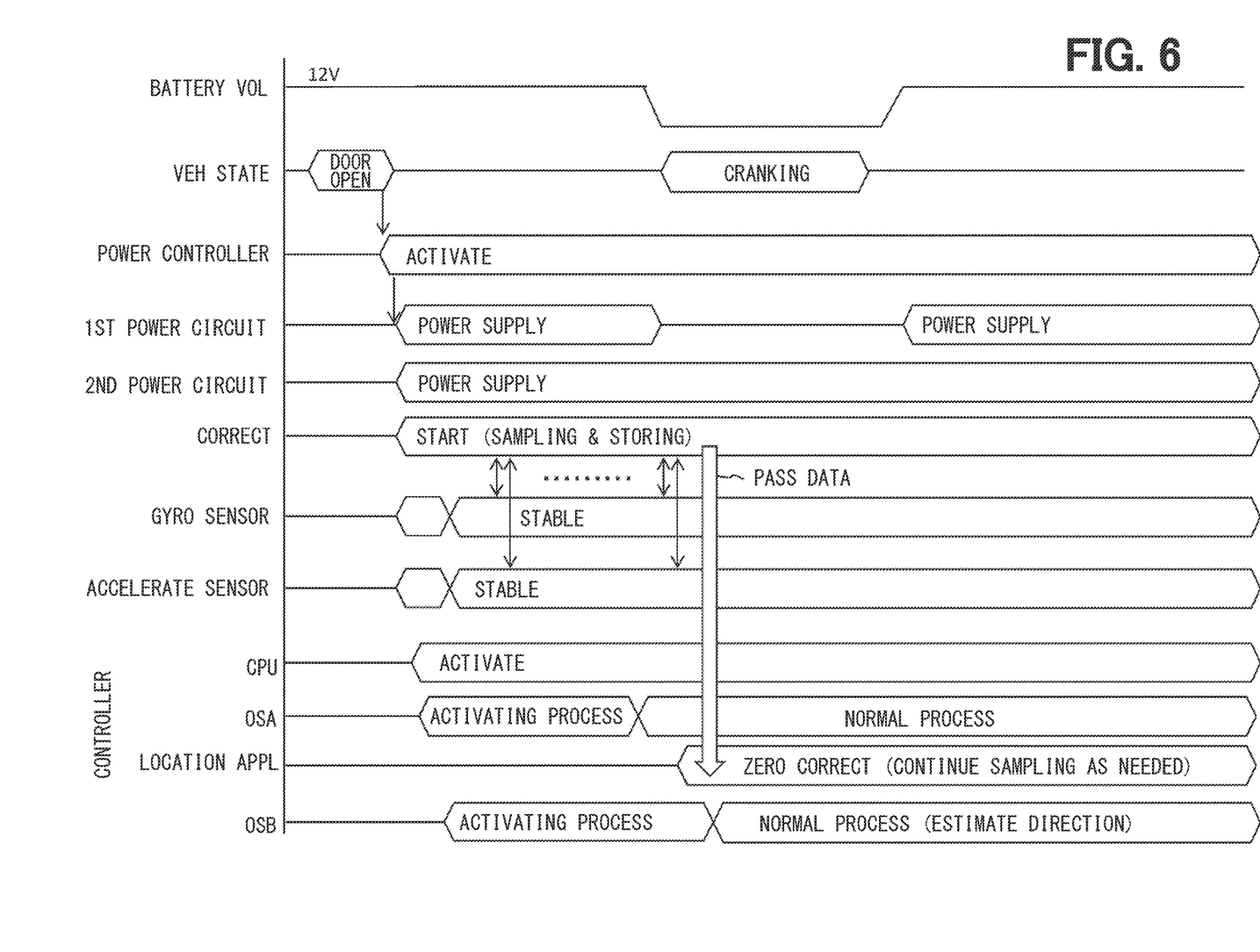

Refer to FIG. 6 illustrating a startup sequence in which the horizontal axis is the time axis. When the vehicle state in which the vehicle door is opened is detected, the power supply control unit 40 is activated and the power supply from each of the first power supply circuit 38 and the second power supply circuit 39 is started. Then, when the correction unit 43 starts operation and the outputs of the gyro sensor 44 and the acceleration sensor 45 become stable, sampling is repeated.

After that, when the controller unit 20 is activated and the location application 26 starts operating, the data stored in the correction unit 43 is passed to the controller unit 20. The location application 26 then performs an operation to obtain a zero point by using the received data. In addition, sampling is continued by the location application 26 as needed. In this case, the location application 26 can perform sampling by directly communicating with the gyro sensor 44 and the acceleration sensor 45 without going through the power supply controller unit 40.

At this time, the second power supply circuit 39 supplies the power to the correction unit 43 (i.e., the power supply controller unit 40), the gyro sensor 44, and the acceleration sensor 45. Therefore, even if cranking occurs during sampling, sampling can be continued. This prevents the cranking from delaying the completion of the zero point correction process.

In this way, the vehicular apparatus 1 enables the process related to the zero point correction to be performed immediately and continuously after the power supply is started. This makes the gyro sensor 44 and the acceleration sensor 45, which require zero point correction, available at the startup.

According to the present embodiment described above, the following effects can be obtained. A vehicular apparatus 1 includes a first power supply circuit 38, a second power supply circuit, a gyro sensor 44, an acceleration sensor 45, and a correction unit 43. The first power supply circuit 38 is configured to perform a first power supply with a first minimum operating voltage being set. The second power supply circuit 39 is configured to perform a second power supply with a second minimum operating voltage being set, the second minimum operating voltage being set to be lower than the first minimum operating voltage. The second power supply circuit is enabled to start the second power supply before an engine of a vehicle is started. The gyro sensor 44 is configured to detect an angular velocity applied to the vehicle. The acceleration sensor 45 is configured to detect an acceleration applied to the vehicle. The correction unit 43 is configured to perform a process related to a zero point correction of the gyro sensor 44 and the acceleration sensor 45. Herein, the gyro sensor 44, the acceleration sensor 45, and the correction unit 43 are configured to receive the second power supply from the second power supply circuit 39.

As a result, the gyro sensor 44, the acceleration sensor 45, and the correction unit 43 can operate even if the controller unit 20 is not activated or before the vehicle starts. Then, since the vehicle is in a stopped state before the vehicle is started, it is possible to perform a process related to the zero point correction. Therefore, it is possible to reduce the risk that the zero point correction may not be completed before the vehicle starts moving.

The vehicular apparatus 1 includes a power supply controller unit 40 that controls the first power supply circuit 38 and the second power supply circuit 39. The correction unit 43 is provided to be included in the power supply controller unit 40. Since the power supply controller unit 40 has fewer tasks to be processed than the main controller unit 20 of the vehicular apparatus 1, the power supply controller unit 40 is activated at high speed when the power supply is started. Therefore, by providing the correction unit 43 in the power supply controller unit 40, the correction unit 43 can be operated immediately after the power supply is started. Therefore, the process related to the zero point correction can be started quickly.

The power supply controller unit 40 of the vehicular apparatus 1 controls the first power supply circuit 38 and the second power supply circuit 39 to start their power supplies, respectively, when a signal indicating that the vehicle door is opened is input. As a result, the process related to the zero point correction can be started before the engine is started, that is, before the vehicle becomes movable. Therefore, the time when the zero point correction is completed at the startup can be advanced compared to a known method. Even if the vehicle moves immediately after the engine is started, it is possible to reduce the possibility that the zero point correction may not be completed before the vehicle starts moving.

The vehicular apparatus 1 includes a controller unit 20 for executing a location application 26 that uses the gyro sensor 44 and the acceleration sensor 45. The correction unit 43 temporarily stores sensor data acquired before the controller unit 20 is activated when performing a process related to the zero point correction. In addition, after the controller unit 20 is activated, the correction unit 43 passes the stored data to the controller unit 20. As a result, the process related to the zero point correction can be started without waiting for the activation of the controller unit 20.

The controller unit 20 of the vehicular apparatus 1 includes a plurality of functional units. The plurality of functional units include a control-related functional unit realized by the first OS 24A that mainly processes information about the vehicle, and a multimedia-related functional unit realized by the second OS 24B that mainly processes multimedia information. The first power supply circuit 38 supplies power to the multimedia-related device 34, which is mainly used by the functional unit relating to the multimedia. The second power supply circuit 39 supplies power to the controller unit 20 and the control-related device 31 mainly used by the functional unit related to the control.

In order to supply power to the control-related device 31, a low voltage compatible power supply circuit like the second power supply circuit 39 is required. That is, by providing the vehicular apparatus 1 as an integrated type, it is possible to clear a known hurdle that it is difficult to adopt a dedicated power supply circuit in terms of costs.

This makes it possible to start the process related to the zero point correction even before the vehicle becomes movable. In addition, it becomes possible to continue the process related to the zero point correction even during cranking. Therefore, the time when the zero point correction is completed at the startup can be advanced compared to a known apparatus. Furthermore, even if the vehicle moves immediately after the engine is started, it can be expected that the zero point correction may be completed before the vehicle starts moving.

The vehicular apparatus 1 includes a meter application 25 as a functional unit for performing a display on the meter display 2. The information displayed on the meter display 2 includes information that should be displayed even when the vehicle is stopped, such as the warning lights 8 described above. That is, when the vehicular apparatus 1 includes a functional unit that performs a display on the meter display 2, there is a strong motivation to provide the second power supply circuit 39 and start the power supply before the vehicle moves. Therefore, it is possible to eliminate the hurdle when providing the power supply source for driving the sensor.

In the present embodiment, the correction unit 43 shows an example of sampling as a process related to the zero point correction. However, the correction unit 43 can perform the process until the zero point is specified by the calculation. In this case, by passing the correction value of the zero point correction after the controller unit 20 is activated, the direction of the vehicle can be specified by the location application 26.

In the present embodiment, the gyro sensor 44 and the acceleration sensor 45 are exemplified as the sensor. However, if the sensor requires a zero point correction, another sensor such as a speed sensor can be targeted.

While the present disclosure has been described in accordance with the present embodiment, it is understood that the present disclosure is not limited to the present embodiment or structures. The present disclosure includes various modifications and deformations within an equivalent range. In addition, various combinations and forms, and further, other combinations and forms including only one element, or more or less than these elements are also within the sprit and the scope of the present disclosure.

In the above embodiment, each of the controller unit 20 (i.e., the application controller 20) and the power supply controller unit 40 (i.e., the power controller 40) may be provided as one or more than one controller. Such a controller and method thereof described in the present disclosure may be implemented by one or more than one special-purpose computer. Such a special-purpose computer may be created (i) by configuring (a) a memory and a processor programmed to execute one or more particular functions embodied in computer programs, or (ii) by configuring (b) a processor provided by one or more special-purpose hardware logic circuits, or (iii) by configuring a combination of (a) a memory and a processor programmed to execute one or more particular functions embodied in computer programs and (b) a processor provided by one or more special-purpose hardware logic circuits. Further, the computer program may be stored in a computer-readable non-transitory tangible storage medium as instructions executed by a computer.

For reference to further explain features of the present disclosure, the description is added as follows.

In a known vehicular navigation apparatus, the vehicle position and traveling direction are estimated based on (i) the angular velocity detected by the gyro sensor and (ii) the vehicle speed and acceleration detected by the vehicle speed sensor and the acceleration sensor; a vehicle mark indicating the direction of the vehicle is thereby displayed.

In order to correctly detect the angular velocity with the gyro sensor, it is necessary to correct the zero point of the gyro sensor while the vehicle is stopped after the power of the gyro sensor is turned on. If this zero point correction is not performed, the direction of the vehicle cannot be estimated correctly. This may give a sense of discomfort such as the displayed vehicle mark straying. Therefore, there is disclosed a technique in which when the zero point correction cannot be performed, a display format different from the usual one is used so as not to give such a sense of discomfort.

If a gyro sensor is provided, it is of course desirable to make the gyro sensor available. However, as a result of detailed examination by the inventor, the gyro sensor requires a certain period of time for the output to stabilize when the power is turned on. Therefore, it has been found that if the gyro sensor is turned on when the vehicle is started and the vehicle is moved immediately, it is assumed that the zero point correction is not completed.

Further, it is known that when the vehicle is started, a voltage drop occurs in the power supply voltage supplied from the battery due to so-called cranking. Then, when the voltage drops, the power is not supplied to the gyro sensor, and the time to start the zero point correction is delayed. The issue was found which assumes that the zero point correction is not completed by the time when the vehicle moves.

That is, when a gyro sensor is provided in a vehicular apparatus, it is not easy to make the gyro sensor available immediately after activation of the gyro sensor. Therefore, the fact is that known navigation apparatuses have no choice but to adopt a coping method that does not use a gyro sensor. The same applies not only to the gyro sensor but also to the acceleration sensor or the speed sensor.

It is thus desired for the present disclosure to provide a vehicular apparatus capable of reducing the risk that the zero point correction will not be completed before the vehicle starts moving.

An aspect of the present disclosure described herein is set forth in the following clauses.

According to an aspect of the present disclosure, a vehicular apparatus is provided to include a first power supply circuit, a second power supply circuit, a sensor, and a correction unit. The first power supply circuit is configured to perform a first power supply with a first minimum operating voltage being set. The second power supply circuit is configured to perform a second power supply with a second minimum operating voltage being set, the second minimum operating voltage being set to be lower than the first minimum operating voltage. The second power supply circuit is enabled to start the second power supply before an engine of a vehicle is started. The sensor is configured to detect an angular velocity or an acceleration applied to the vehicle. The correction unit is configured to perform a process related to a zero point correction of the sensor. Herein, the sensor and the correction unit are configured to receive the second power supply from the second power supply circuit.

According to the above configuration, the sensor and the correction unit can operate (i) even when the controller unit, which implements or executes an application using the sensor, is not activated, or (ii) even before the vehicle starts. Before the vehicle is started, the vehicle is naturally in a stopped state. It is thus possible to perform the process related to the zero point correction of the sensor. Therefore, it is possible to reduce the possibility that the zero point correction may not be completed before the vehicle starts moving.

What is claimed is:

1. A vehicular apparatus comprising:
a first power supply circuit configured to perform a first power supply with a first minimum operating voltage being set;
a second power supply circuit configured to perform a second power supply with a second minimum operating voltage being set, the second minimum operating voltage being set to be lower than the first minimum operating voltage, the second power supply circuit being enabled to start the second power supply before an engine of a vehicle is started;
a sensor configured to detect an acceleration or an angular velocity applied to the vehicle; and
a correction unit configured to perform a process related to a zero point correction of the sensor,
wherein
the sensor and the correction unit are configured to receive the second power supply from the second power supply circuit.

2. The vehicular apparatus according to claim 1, further comprising:
a power supply controller unit configured to control the first power supply circuit and the second power supply circuit,
wherein
the correction unit is provided to be implemented in the power supply controller unit.

3. The vehicular apparatus according to claim 2, wherein:
the power supply controller unit is further configured to cause the first power supply circuit and the second power supply circuit, respectively, to start the first power supply and the second power supply in response to a signal being input, the signal indicating that a vehicle door of the vehicle is opened.

4. The vehicular apparatus according to claim 1, further comprising:
a controller unit configured to execute an application using the sensor,
wherein
in performing the process related to the zero point correction, the correction unit is further configured to store temporarily a data acquired by the sensor before the controller unit is activated, and pass the stored data to the controller unit in response to the controller unit being activated.

5. The vehicular apparatus according to claim 4, wherein:
the controller unit is further configured to include a plurality of functional units including a control-related functional unit that is a functional unit related to a control and a multimedia-related functional unit that is a functional unit related to a multimedia,
the control-related functional unit being implemented by a first operating system configured to mainly process information about the vehicle,
the multimedia-related functional unit being implemented by a second operating system configured to mainly process multimedia information;
the first power supply circuit is further configured to perform the first power supply to a device mainly used by the multimedia-related functional unit; and
the second power supply circuit is further configured to perform the second power supply to the controller unit and a device mainly used by the control-related functional unit.

6. The vehicular apparatus according to claim 5, wherein the controller unit is further configured to include a functional unit that serves as the control-related functional unit to perform a display on a meter display.

7. A vehicular apparatus comprising:
a first power supply circuit configured to perform a first power supply with a first minimum operating voltage being set;
a second power supply circuit configured to perform a second power supply with a second minimum operating voltage being set, the second minimum operating voltage being set to be lower than the first minimum operating voltage, the second power supply circuit being enabled to start the second power supply before an engine of a vehicle is started;

a sensor configured to detect an acceleration or an angular velocity applied to the vehicle; and a first controller configured to perform a process related to a zero point correction of the sensor, wherein the sensor and the first controller are configured to receive the second power supply from the second power supply circuit.

8. The vehicular apparatus according to claim 7, wherein the first controller is further configured to control the first power supply circuit and the second power supply circuit.

9. The vehicular apparatus according to claim 7, further comprising:

a second controller configured to execute an application using the sensor, wherein in performing the process related to the zero point correction, the first controller is further configured to store temporarily a data acquired by the sensor before the second controller is activated, and pass the stored data to the second controller in response to the second controller being activated.

* * * * *